(12) United States Patent
McCleery

(10) Patent No.: US 7,389,254 B2
(45) Date of Patent: Jun. 17, 2008

(54) SYSTEMS AND METHODS FOR AUTOMATED CUSTOMER ORDER STATUS PROCESSING

(75) Inventor: Kraig McCleery, Acworth, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 886 days.

(21) Appl. No.: 10/305,033

(22) Filed: Nov. 27, 2002

(65) Prior Publication Data

US 2004/0103039 A1 May 27, 2004

(51) Int. Cl.
*G06Q 30/00* (2006.01)
(52) U.S. Cl. ............................................. 705/26; 705/1
(58) Field of Classification Search .................. 705/26; 706/1, 8, 26
See application file for complete search history.

(56) References Cited

U.S. PATENT DOCUMENTS

| | | | | |
|---|---|---|---|---|
| 5,751,802 | A * | 5/1998 | Carr et al. ............. | 379/201.12 |
| 6,088,683 | A * | 7/2000 | Jalili ........................... | 705/26 |
| 6,493,694 | B1 * | 12/2002 | Xu et al. ...................... | 706/47 |
| 7,047,203 | B2 * | 5/2006 | Johnson ........................ | 705/1 |
| 2001/0001143 | A1 * | 5/2001 | Jones et al. .................... | 705/1 |
| 2002/0106067 | A1 * | 8/2002 | Sandel et al. ......... | 379/201.03 |
| 2004/0024646 | A1 * | 2/2004 | Iry et al. ....................... | 705/26 |
| 2004/0024647 | A1 * | 2/2004 | Cheung ....................... | 705/26 |

OTHER PUBLICATIONS

Anonymous, "MicroStrategy: MicroStrategy Telecaster delivers e-business intelligence to customers via telephone," Sep. 13, 1999, pp. 3.*
McCleery, Kraig, "Systems and Methods for Automated Customer Status Processing," pp. 3.*

* cited by examiner

*Primary Examiner*—F. Zeender
*Assistant Examiner*—Asfand M Sheikh
(74) *Attorney, Agent, or Firm*—Withers & Keys, LLC

(57) ABSTRACT

The present invention relates to systems and methods for automated customer order status processing associated with a service order. In an embodiment of the present invention, a system includes a first order processing system, a second order processing system, and an automated telephone call processing system. The first order processing system is configured to receive order information associated with a customer and a service order. The second order processing system is coupled to the first order processing system and is configured to receive at least a first subset of the order information associated with the customer. The automated telephone call processing system is coupled to the second order processing system and is configured to receive at least a portion of the first subset of the order processing information, initiate a telephone call to the customer, and notify the customer as to a status of the service order.

16 Claims, 4 Drawing Sheets

| | | |
|---|---|---|
| 101 | Service Order Number: | ACO10CRH2XHA | 102 |
| 105 | Revision ID: | | 106 |
| 109 | Order Date: | 10/17/2002 | 110 |
| 113 | Due Date: | 11/08/2002 | 114 |
| 117 | Dva Date: | None | 118 |
| 121 | Designed Order: | N | 122 |
| 125 | Customer Address: | 555 PARK PL NE, Atlanta | 126 |
| 129 | Customer State: | GA | 130 |
| 133 | Customer Phone: | 334-555-3527 | 134 |
| 137 | Order Writer: | MTHOMAS | 138 |
| 141 | Circuit ID: | 12.ABCD.123321.BS | 142 |
| 145 | Tech CUID: | Racquel Row | 146 |
| 149 | Remarks: | | 150 |
| 153 | Status: | COMPLETED | 154 |
| 157 | Seq. Number: | 004 | 158 |
| 161 | SR: | CAX | 162 |
| 165 | Order Time: | 13:22 | 166 |
| 169 | Rid Date: | None | 170 |
| 173 | Close Date: | 10/17/2002 | 174 |
| 177 | Customer Name: | Gamma Communications, Inc. | 178 |
| 181 | Customer City: | ATLNGAABCD5 | 182 |
| 185 | Customer Contact: | FRAME PROVISION | 186 |
| 189 | Bill Pon: | DLTBLS12345F | 190 |
| 193 | Order Writer Phone: | 800-555-8103 x-5555 | 194 |
| 197 | Circuit Type: | HCEO | 198 |

| 101 | Service Order Number: | ACO10CRH2XHA | 102 |
|---|---|---|---|
| 105 | Revision ID: | | 106 |
| 109 | Order Date: | 10/17/2002 | 110 |
| 113 | Due Date: | 11/08/2002 | 114 |
| 117 | Dva Date: | None | 118 |
| 121 | Designed Order: | N | 122 |
| 125 | Customer Address: | 555 PARK PL NE, Atlanta | 126 |
| 129 | Customer State: | GA | 130 |
| 133 | Customer Phone: | 334-555-3527 | 134 |
| 137 | Order Writer: | MTHOMAS | 138 |
| 141 | Circuit ID: | 12.ABCD.123321.BS | 142 |
| 145 | Tech CUID: | Racquel Row | 146 |
| 149 | Remarks: | | 150 |
| 153 | Status: | COMPLETED | 154 |
| 157 | Seq. Number: | 004 | 158 |
| 161 | SR: | CAX | 162 |
| 165 | Order Time: | 13:22 | 166 |
| 169 | Rid Date: | None | 170 |
| 173 | Close Date: | 10/17/2002 | 174 |
| 177 | Customer Name: | Gamma Communications, Inc. | 178 |
| 181 | Customer City: | ATLNGAABCD5 | 182 |
| 185 | Customer Contact: | FRAME PROVISION | 186 |
| 189 | Bill Pon: | DLTBLS12345F | 190 |
| 193 | Order Writer Phone: | 800-555-8103 x-5555 | 194 |
| 197 | Circuit Type: | HCEO | 198 |

FIG. 1

SYSTEMS AND METHODS FOR AUTOMATED CUSTOMER ORDER STATUS PROCESSING

BACKGROUND OF THE INVENTION

1. Field of the Invention

The present invention relates to automated processing systems. More particularly, the present invention relates to systems and methods for automated customer order status processing.

2. Background Information

Telecommunications service providers operate known customer order processing systems. For example, a customer can contact the telecommunications service provider and request that a telecommunications service be provisioned. The telecommunications service provider can input and store the customer order information in the known computer systems. A telecommunications service provider employee can access the customer order information and determine that there is a problem with the order. For example, the level of service requested may be incompatible with a type of circuit requested or available. As another example, the customer may have requested a circuit identifier that is already in use by that customer or another customer.

After the problem is discovered, however, the customer typically has to wait until contacted by a telecommunications service provider employee via a telephone call before the customer becomes aware that there is a problem with the order. For example, the telecommunications service provider can include multiple entities (e.g., divisions, operating companies, etc.) involved with ordering the telecommunications service and multiple information technology ("IT") systems as well. Customer contact concerning the problem can be delayed by these multiple entities and multiple IT systems. In addition, calling the customer can be a manual step and can require one telecommunications service provider employee to contact another telecommunications service provider employee in order to contact the customer. Moreover, even if there are no problems with the order, the customer can also experience delay in knowing that his or her order was successfully completed. In view of the foregoing, it can be appreciated that a substantial need exists for systems and methods that can advantageously provide for automated customer order status processing.

BRIEF SUMMARY OF THE INVENTION

The present invention relates to systems and methods for automated customer order status processing. In an embodiment of the present invention, a system includes a first order processing system, a second order processing system, and an automated telephone call processing system. The first order processing system is configured to receive order information associated with a customer and a service order. The second order processing system is coupled to the first order processing system and is configured to receive at least a first subset of the order information associated with the customer. The automated telephone call processing system is coupled to the second order processing system and is configured to receive at least a portion of the first subset of the order processing information, initiate a telephone call to the customer, and notify the customer as to a status of the service order.

According to another embodiment of the present invention, a method for automated customer order status processing includes receiving order information associated with a customer and a service order at a first order processing system. The method also includes transmitting at least a first subset of the order information associated with the customer to a second order processing system, receiving a service order status indicator, and storing the service order status indicator as part of at least the first subset of the order information associated with the customer. At least a portion of the first subset of the order information associated with the customer is transmitted to an automated telephone call processing system, which initiates a telephone call to the customer and notifies the customer as to a status of the service order.

In a further embodiment of the present invention, a system for automated customer order status processing includes a means for initial order processing, a means for secondary order processing, and an automated telephone call processing system. The means for initial order processing is configured to receive order information associated with a customer and a service order. The means for secondary order processing is coupled to the means for initial order processing and is configured to receive at least a first subset of the order information associated with the customer. The automated telephone call processing system is coupled to the means for secondary order processing and includes means for receiving at least a portion of the first subset of the order processing information, means for initiating a telephone call to the customer, and means for notifying the customer as to a status of the service order.

BRIEF DESCRIPTION OF THE DRAWINGS

FIG. 1 shows information contained in an order in accordance with an embodiment of the present invention.

Figure 2:
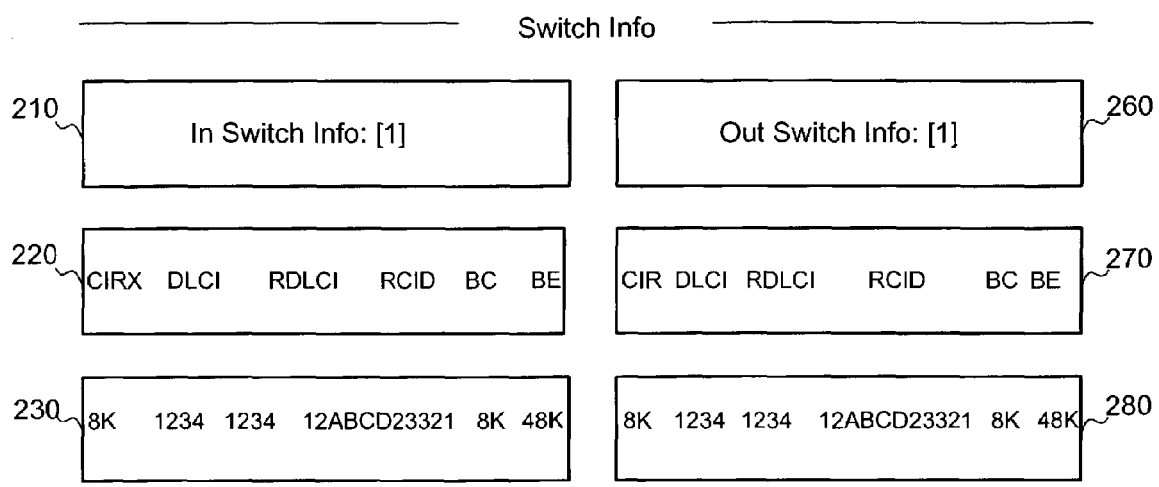
FIG. 2 shows additional information that can be included as part of a customer order.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Embodiments of the present invention relate to systems and methods for automated customer order status processing and encompass improvements and enhancements to known systems for customer order status processing. For example, embodiments of the present invention relate to improvement to a known system that in part processes customer orders requesting broadband services. Orders are typically initially processed by a Work Force Administration ("WFA") system, which can be a workflow administration system that initially processes orders received by the telecommunications service provider. The WFA system can initially process orders related to a plurality of telecommunication service orders, the plurality of telecommunication service orders including broadband service orders, commercial broadband service orders, residential broadband service orders, voice telephone service orders, residential voice telephone service orders, commercial voice telephone service orders, narrowband data services, and so on. When a service order was placed (e.g., initially processed, etc.), often there can be errors on the order.

After the orders are initially processed by the WFA system (e.g., without error(s), with error(s), etc), a system named Broadband Network Infrastructure Support Center ("BNISC") Order Processing System ("BOPS"), which is coupled to the WFA system, further processes the orders. The orders with errors are placed in a missed appointment status category, and the BOPS system interfaces with another system that informs a group called the Interconnection Services ("ICSC"). The ICSC group is separate from the group that actually input the order (e.g., with error(s), without error(s), etc.) into the WFA system. Employees of the ICSC group interact with a client/server system (e.g., via an internet connection, via an encrypted internet connection, etc.) that can pop-up the orders on a list. The ICSC employees can follow that list and when they get to an order on the list with errors, they would in turn call the customer that placed the order.

Typically, the ICSC employee has to make a number of calls to the customer to get the information that needs to be corrected. After getting the correct information, the ICSC employee enters it into the order processing system, sets a status indicator (e.g., a flag) indicating that the order is ready for additional processing, and reissues the order. The newly-corrected order would in turn go back into the system to be processed, completed, or flagged for error-correction. Each system takes a certain period of time to process the order through error-correction.

For example, typically it can take a while for a customer service technician to identify the error and put the order in the error status. Then another customer service person must identify the order on a list (which can take five days from being placed in the error status). Then that customer service person would have to get in touch with the customer in person via a telephone call and often wait for a call back from the customer (which again can take a couple of days). Thus, what can happen with orders that contain errors is that they can become past due in that period of time. After the customer service person finally does contact the customer, the order would be corrected and resubmitted into the order processing system. Moreover, for example, the order could be corrected by the customer service person inputting information received from the customer or by having the customer enter the corrected information via a web page and an internet connection.

An example of an error that can be encountered during order processing is a circuit identifier error. For example, a request on the order can be broadband address of 12.ASDF.123321.KL. When a customer service technician receives the order and begins to process it technically, he may determine that this address is already in use (e.g., by that customer, by another customer, etc.). Accordingly, the telecommunications service provider needs to contact the customer to let him or her know that the requested or specified broadband address is already in use and that the order needs to be corrected in order to be further processed.

Embodiments of the present invention relate to, for example, frame relay and Asynchronous Transfer Mode ("ATM") broadband circuits. An example of a broadband circuit identifier error relates to Data Link Connection Identifier ("DLCI"). A DLCI is a frame relay term defining a ten bit field of the address field. The DLCI identifies the data link and its service parameters including frame size, committed information rate ("CIR"), committed burst size ("Bc"), burst excess size ("Be"), and committed rate measurement interval ("TC"). Each of these service parameters can be customer-dependent and may need to be specified by the customer. Examples of additional service parameters that may need to be specified include a host circuit ID and a remote circuit ID, each of which can have a particular DLCI. In another embodiment of the present invention, an order issuer obtains the correct information from the customer and then contacts an ISCS technician, who then corrects the order of the customer. Then when the technician has the reissued order, the technician could then start setting up the circuits from a technical standpoint.

FIG. 1 shows information contained in an order in accordance with an embodiment of the present invention. An order can include one or more data field identifiers such as data field identifiers 101 to 197. The order can also include one or more data fields corresponding to each data field identifier such as data fields 102 to 198.

Examples of data field identifiers that can be included in an order and stored in systems in accordance with embodiments in the present invention include, for example, the following data field identifiers. A Service Order Number 101, a Revision Identifier ("ID") 105, an Order Date 109, a Due Date 113, a Designed verified assigned ("Dva") Date 117, a Designed Order 121, a Customer Address 125, a Customer State 129, a Customer Phone 133, an Order Writer 137, a Circuit ID 141, a Tech Common User ID ("CUID") 145, a Remarks 149, Status 153, a Sequence Number 157, a System Request (SR) data field identifier 161, an Order Time 165, a Record issue date ("Rid") Date 169, a Close Date 173, a Customer Name 177, a Customer City 181, a Customer Contact 185, a Bill Purchase order number ("Pon") 189, an Order Writer Phone 193, and a Circuit Type 197.

The data field identifiers 101 through 197 can be associated with one or more of the data fields 102 through 198. For example, as is illustrated in FIG. 1, Service Order Number data field identifier 101 is associated with data field 102, which includes a particular Service Order Number of AC010CRH2XHA. As a further example, the Customer Address data field identifier 125, the Customer State data field identifier 129, and the Customer Phone data field identifier 133 are associated with data fields 126 through 134. Data field 126 stores a customer address of 555 Park Place NE, data field 130 stores a customer state of Georgia, and data field 134 stores a customer phone number of 334-555-3527.

FIG. 2 shows additional information that can be included as part of a customer order. Such information can also be displayed as part of a GUI displaying information corresponding to the order. FIG. 2 shows switch information associated with the order. The switch information can include In Switch Info data fields 210 and Out Switch Info data fields 260. The In Switch Info data fields 210 can include data field identifiers 220 and data fields 230. The Out Switch Info data area 260 can include Out Switch Info data field identifiers 270 and Out Switch Info data fields 280. For example, In Switch Info data field identifiers 220 can include Committed Information Rate Field Identifier ("CIRX"), DLCI, a Receive DLCI ("RDLCI"), a Receive Circuit ID ("RCID"), a Bc, and a Be. In Switch Info data fields 230 can store data values corresponding to the In Switch Info data field identifiers 220. Likewise, Out Switch Info data fields 280 can store data values corresponding to Out Switch Info data field identifiers 270. Out Switch Info data field identifiers 270 can include Committed Information Rate ("CIR"), DLCI, an RDLCI, an RCID, a Bc, and a Be.

Figure 3:
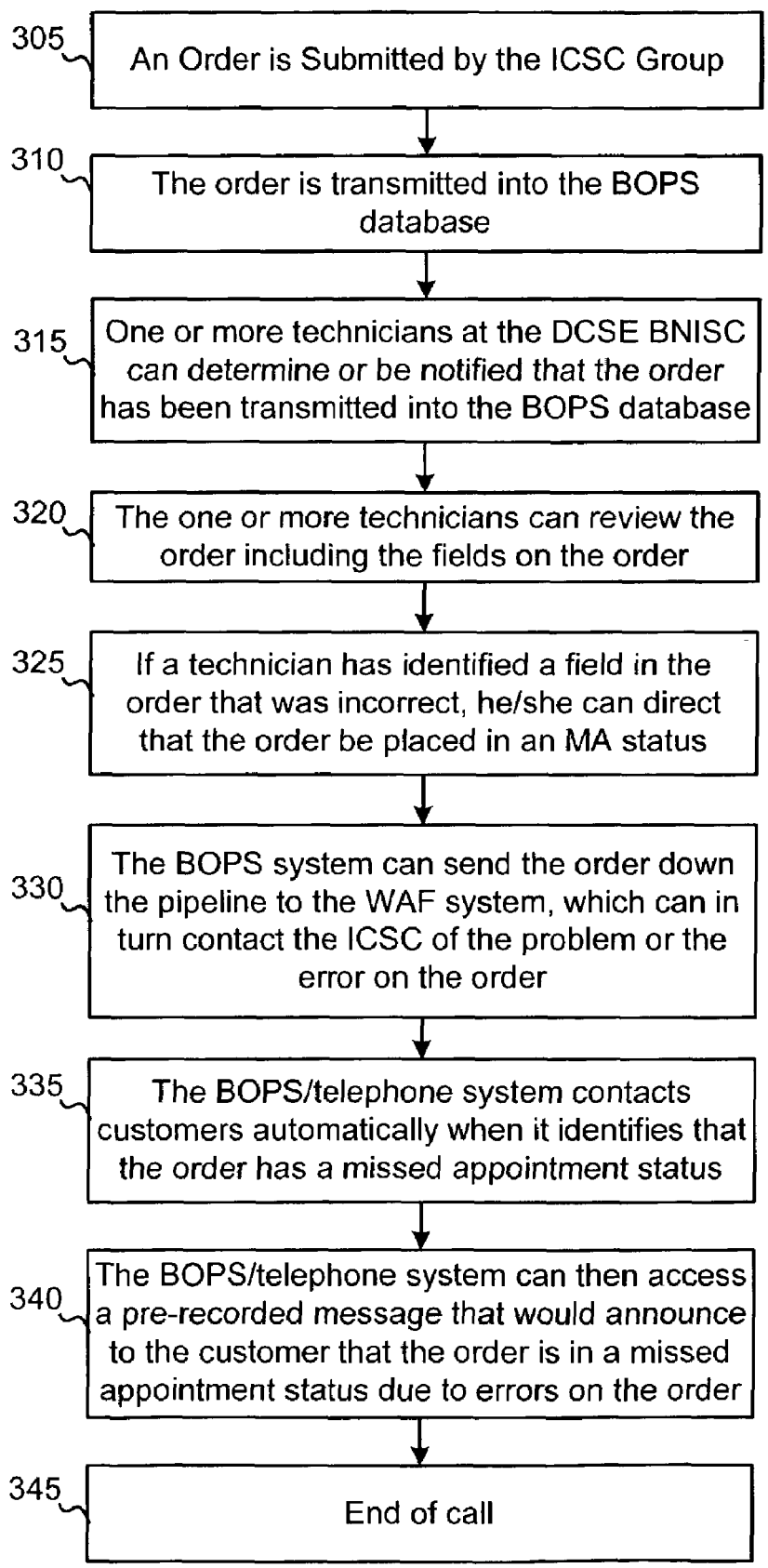
FIG. 3 shows methods steps in accordance with an embodiment of the present invention.

FIG. 3 shows methods steps in accordance with an embodiment of the present invention. According to an embodiment of the present invention, a system of automatically contacting the customers for automated broadband customer order status processing is established. For example, an order is submitted by the ICSC group (step 305), transmitted into the BOPS database (step 310), and can be displayed on a graphical user interface ("GUI") interface. One or more technicians at the Data Customer Support Center ("DCSC") BNISC can determine or be notified that the order has been transmitted into the BOPS database (step 315). The one or more technicians can review the order (e.g., while displayed on a GUI interface, etc) including the fields on the order (step 320). If a technician has identified a field in the order that was incorrect, he or she can direct that the order be placed in a "missed appointment" ("MA") status (step 325). When the order has been placed in the MA status, the BOPS system can sends the order back down the pipeline to the WFA system, which can in turn inform the ICSC of the problem or the error on the order (step 330). According to an embodiment of the present invention, the BOPS system is coupled to an automated telephone call processing system.

The BOPS system/automated telephone call processing system contacts the customer automatically when it identifies that the order has a missed appointment status (step 335). The BOPS/telephone system can then access a pre-recorded message that announces to the customer that the order is in a missed appointment status due to errors on the order (step 340). For example, the pre-recorded message can announce "Please contact Interconnection Services at (123) 321-1234 in order to give Interconnection Services additional information that is necessary to complete your order." In an embodiment, that would be end of call (step 345).

In another embodiment, the BOPS system sends the automated telephone call processing system information necessary for completion of the call to the broadband customer. For example, the BOPS system can send the automated telephone call processing system the telephone number of the broadband customer and a message indicator that corresponds to the message to be announced to the broadband customer. In a further embodiment, the BOPS system can also transmit to the automated telephone call processing system the callback number that the broadband customer should call back to provide corrected or updated service parameter information.

Figure 4:
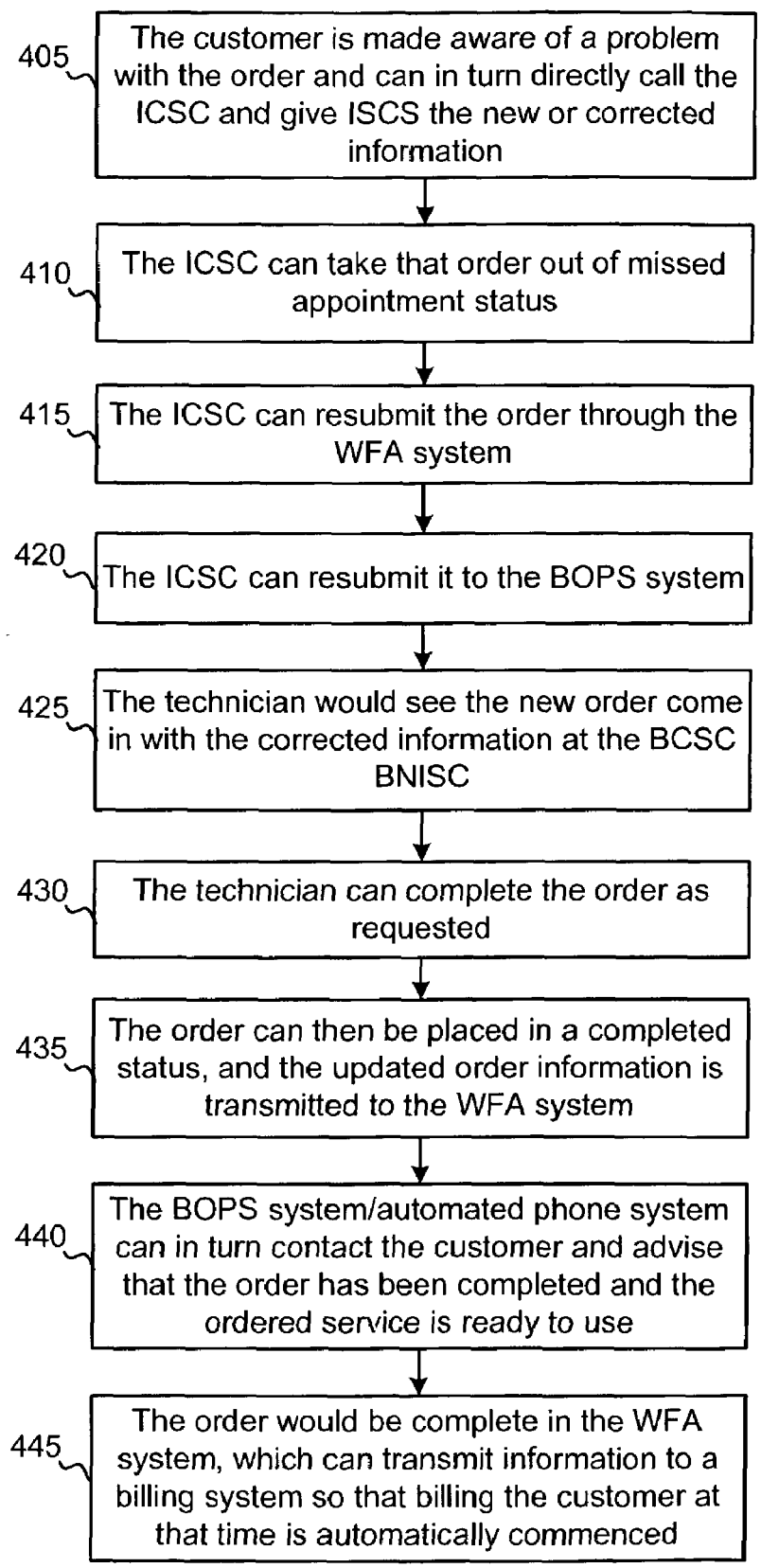
FIG. 4 shows method steps in accordance with an embodiment of the present invention.

FIG. 4 shows method steps in accordance with an embodiment of the present invention. As illustrated in FIG. 3, the customer is made aware that there is a problem with his or her order. The customer can in turn directly call the ICSC and give ISCS the new or corrected information (step 405). The ICSC can take that order out of missed appointment status (step 410), resubmit it through the WFA system (step 415), which then would in turn resubmit it to the BOPS interface (step 420). The technician would see the new order come in with the corrected information at the DCSC BNISC (step 425). The technician can complete the order as requested if, for example, all the order information is correct (step 430). The order can then be placed in a completed status, and the updated order information is transmitted to the WFA system (step 435). The BOPS system/automated phone system can in turn contact the customer and advise the customer (e.g., via another pre-recorded message) that the order had been completed and the ordered service is ready to use (step 440). The order would be complete in the WFA system, which can transmit information to a billing system so that billing to the customer at that time is automatically commenced (step 445). Accordingly, the customer can be efficiently queried for information related to the order and notified of the new service after the order is successfully processed.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

Embodiments of systems and methods for automated broadband customer order status processing have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be defined by the claims appended hereto, and by their equivalents.

What is claimed is:

1. A system for automated customer order status processing, the system comprising:

a first telecommunications order processing system, the first telecommunications order processing system receiving order information associated with a customer and a service order for a telecommunications service, the order information comprising at least one data field and at least one corresponding data field identifier associated with switch information, the switch information associated with the service order for the telecommunications service;

a second telecommunications order processing system coupled to the first telecommunications order processing system, the second telecommunications order processing system receiving at least a first subset of the order information associated with the customer;

a third telecommunications order processing system coupled to the second telecommunications order processing system and in communication with the first telecommunications order processing system, the third telecommunications order processing system monitoring the service order and maintaining a list of erroneous service orders;

an automated telephone call processing system coupled to the second telecommunications order processing system, wherein the automated telephone call processing system is configured to receive at least a portion of the first subset of the order processing information and wherein the automated telephone call processing system further initiates a telephone call to the customer to notify the customer as to a status of the service order, the status comprising a missed appointment status category, the missed appointment status category comprising a service order error, and directions as to how the customer may submit order corrections to the third telecommunications order processing system;

a communication system by which the third telecommunications order processing system receives the order corrections from the customer, wherein the third telecommunications order processing system institutes the corrections within the service order and resubmits the corrected service order to the first telecommunications order processing system for reprocessing; and an automated billing system configured to receive information automatically sent from the first telecommunications order processing system that reports the completion of the corrected service order whereby billing of the customer for the telecommunications service may automatically begin.

2. The system of claim 1, wherein the portion of the first subset of the order processing information includes a telephone number of the customer.

3. The system of claim 1, wherein the first order processing system is configured to receive order information associated with a plurality of telecommunications service orders, wherein the plurality of the telecommunications service orders includes the service order.

4. The system of claim 3, wherein the plurality of telecommunications service orders further include voice telephone service orders and narrowband data service orders.

5. The system of claim 3, wherein the service order is a commercial service order.

6. The system of claim 1, wherein the service order is one or more of a frame relay service order and an asynchronous transfer mode ("ATM") service order.

7. A method for automated customer order status processing associated with a service order, the method comprising:

receiving order information associated with a customer and a service order for a telecommunications service at a first order processing system, the order information comprising at least one data field and at least one corresponding data field identifier associated with switch information, the switch information associated with the service order for the telecommunications service;

transmitting at least a first subset of the order information associated with the customer to a second order processing system;

transmitting at least the first subset of the order information associated with the customer to a third order processing system;

receiving a service order status indicator at the second order processing system, the service order status indicator including a service order missed-appointment status indicator that indicates the existence of incorrect order information in the service order and causes the service order to be returned to the first order processing system for reprocessing;

storing the service order status indicator as part of at least the first subset of the order information associated with the customer at the second order processing system;

transmitting at least a first portion of the first subset of the order information associated with the customer to an automated telephone call processing system in communication with the second order processing system;

initiating a telephone call to the customer;

notifying the customer as to a status of the service order, the status comprising a missed appointment status category, the missed appointment status category comprising a service order error and directions as to how the customer may submit order corrections to the third order processing system;

submitting order corrections to the third order processing system by the customer over a communication system, wherein the third order processing system effectuates the correction to the service order; transmitting the corrected service order to the first order processing system for reprocessing; and automatically receiving information that reports the completion of the corrected service order by an automated billing system sent from the first order processing system whereby billing of the customer for the telecommunication service may automatically begin.

8. The method of claim 7, wherein the service order status indicator includes a service order error status indicator.

9. The method of claim 7, further comprising displaying at least a second portion of the first subset of the order information associated with the customer.

10. The method of claim 9, wherein receiving a service order status indicator is based at least in part on displaying the second portion of the first subset of the order information associated with the customer.

11. The method of claim 7, wherein transmitting the first portion of the first subset of the order information associated with the customer to an automated telephone call processing system includes transmitting a telephone number of the customer.

12. The method of claim 11, wherein transmitting the first portion of the first subset of the order information associated with the customer to an automated telephone call processing system further includes transmitting a message announcement identifier.

13. A system for automated customer order status processing, the system comprising:

means for initial order processing to receive order information associated with a customer and a service order for a telecommunications service, the order information comprising at least one data field and at least one corresponding data field identifier associated with switch information, the switch information associated with the service order for the telecommunications service;

means for secondary order processing coupled to the means for initial order processing, wherein the means for secondary order processing is configured to receive at least a first subset of the order information associated with the customer and includes a means for receiving a service order status indicator further comprising a service order error status indicator, wherein the service order error status indicator is monitored by the means for secondary order processing and returns the service order to the means for initial order processing for reprocessing;

an automated telephone call processing system coupled to the means for secondary order processing, wherein the automated telephone call processing system includes means for receiving at least a portion of the first subset of the order processing information, means for tertiary order processing coupled to the means for secondary order processing and in communication with the means for initial order processing;

means for initiating a telephone call to the customer, means for notifying the customer as to a status of the service order, the status comprising a missed appointment status category, the missed appointment status category comprising a service order error and directions as to how the customer may submit order corrections to the second order processing system; means for receiving order corrections from the customer by the tertiary order processing system, effectuating the corrections to the service order, and resubmitting the service order to the initial means for order processing for reprocessing; and means for automatically receiving information that reports the completion of the corrected service order by an automated billing system sent from the initial order processing whereby billing of the customer for the telecommunication service may automatically begin.

14. The system of claim 13, wherein the means for initial order processing is configured to receive order information associated with a plurality of telecommunications service orders, and the plurality of telecommunications service orders includes the service order.

15. The system of claim 13, wherein the means for receiving at least a portion of the first subset of the order processing information includes means for receiving a telephone number of the customer.

16. The system of claim 13, wherein the means for notifying the customer as to a status of the service order includes means for playing a pre-recorded announcement to the customer.

* * * * *